United States Patent
Wada

(10) Patent No.: US 6,910,559 B2
(45) Date of Patent: Jun. 28, 2005

(54) MOUNTING STRUCTURE OF DUST COVER IN HYDRAULIC SHOCK ABSORBER

(75) Inventor: Kazuo Wada, Shizuoka (JP)

(73) Assignee: Showz Corporation (JP)

( * ) Notice: Subject to any disclaimer, the term of this patent is extended or adjusted under 35 U.S.C. 154(b) by 0 days.

(21) Appl. No.: 10/412,046

(22) Filed: Apr. 11, 2003

(65) Prior Publication Data

US 2004/0163908 A1 Aug. 26, 2004

(30) Foreign Application Priority Data

Feb. 26, 2003 (JP) .................................. 2003-049987

(51) Int. Cl.$^7$ ................................................ F16F 9/38
(52) U.S. Cl. ............................ 188/322.12; 188/322.19
(58) Field of Search ........................... 188/300, 322.12, 188/322.19; 267/64.12, 120; 280/275, 276, 283

(56) References Cited

U.S. PATENT DOCUMENTS 4,884,665 A * 12/1989 Parker et al. .......... 188/322.17
6,199,672 B1 * 3/2001 Wada et al. ........... 188/322.12
2002/0053494 A1 * 5/2002 Nakamura ............. 188/322.12

FOREIGN PATENT DOCUMENTS

| JP | 10141420 | 11/1996 |
|---|---|---|
| JP | 10277684 | 3/1997 |
| JP | 1151106 | 8/1997 |

* cited by examiner

*Primary Examiner*—Christopher P. Schwartz
(74) *Attorney, Agent, or Firm*—Orum & Roth

(57) ABSTRACT

In a mounting structure of a dust cover in a hydraulic shock absorber, a portion continuously provided in an end portion of a portion forming a tubular portion in a metal pipe material of the dust cover is diameter-reduced to an inner diameter side, and an annular diameter-reduced portion including wall portions at both sides is formed. A flange portion obtained by crimping and folding the wall portions at both sides of the diameter-reduced portion in an axial direction according to a press working is formed so as to be continuously provided in an inner diameter side of one end of the tubular portion, and the flange portion is clamped between a mounting bracket and a support member.

5 Claims, 5 Drawing Sheets

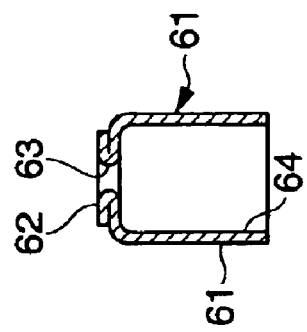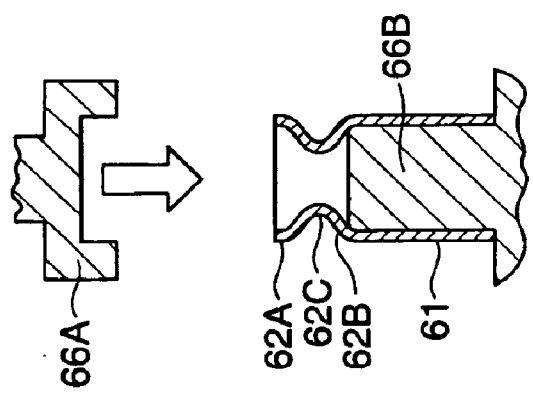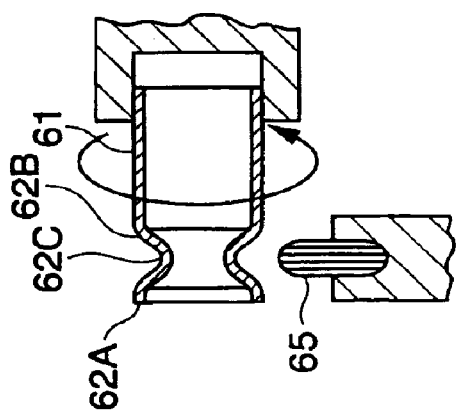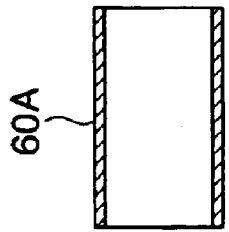

MOUNTING STRUCTURE OF DUST COVER IN HYDRAULIC SHOCK ABSORBER

BACKGROUND OF THE INVENTION

1. Field of the Invention

The present invention relates to a mounting structure of a dust cover in a hydraulic shock absorber such as a front fork of a motor cycle or the like, and a manufacturing method of the dust cover.

2. Description of the Related Art

In a dust cover of a front fork in a motor cycle or the like, an exterior appearance is improved by applying an ornamental chrome plating to a steel plate or the like, for improvement of commodity and saleability properties.

In a dust cover 160 in Japanese Patent Application Laid-Open No. 11-51106, a cylindrical cover main body 165 and a cup-shaped flange 164 are separately formed as shown in FIGS. 5A and 5B. The flange 164 is obtained by drawing a ring-shaped steel plate blank, and is constituted by a short cylinder portion 164a and a flange portion 164b continuously provided in an inner diameter side of the short cylinder portion 164a. The dust cover 160 is structured by fitting and inserting an end portion of the cover main body 165 to an outer periphery of the short cylinder portion 164a in the flange 164 and connecting them by applying a spot welding to four circumferential portions in the fitted and inserted portion. The flange 164 is made of a thicker steel plate than that of the steel plate of the cover main body 165, thereby ensuring a strength of the flange portion 164b.

The prior art has the following problems.

(1) It is hard to maintain a flatness in a top surface portion 178 of the flange portion 164b in the dust cover 160. There is a risk that the dust cover 160 falls down on to incline when bringing the flange portion 164b into contact with a lower surface of a mounting bracket, whereby an opening of the cover main body 165 of the dust cover 160 is in contact with an outer peripheral surface of a cylinder member. The flatness in the top surface portion 178 of the flange portion 164b is not secured because it is hard to maintain a roundness (a radius of circle) in a crossing portion R between the short cylinder portion 164a and the flange portion 164b when drawing the flange 164. A crossing angle of the flange portion 164b with respect to the short cylinder portion 164a becomes an obtuse angle, whereby the top surface portion 178 of the flange portion 164b is open to an outer side in an axial direction. Further, another reason is that the roundness (the radius of circle) is generated in the periphery of a center hole of the top surface portion 178 in the flange portion 164b due to a press roll over (a burr in an opposite side) generated in a side of a blanking surface at a time of blanking the center hole of the top surface portion 178 in the flange portion 164b, the width itself of the flange portion 164b is comparatively small, and a comparatively large roundness (a radius of circle) exists in an outer peripheral side of the flange portion 164b, and the like.

(2) It is difficult to secure an angularity of the flange portion 164b with respect to the center axis of the cover main body 165 when welding the cover main body 165 to the flange 164, and there is a risk that a welding distortion between the flange 164 and the cover main body 165 distorts the flatness in the top surface portion 178 of the flange portion 164b.

(3) A welding trace between the flange 164 and the cover main body 165 is generated after chrome plating the dust cover, so that the exterior appearance commodity and saleability properties are lowered.

(4) Since the dust cover is constituted by the flange 164 and the cover main body 165, the control cost for preparing parts and the like is increased, in addition that welding is required, whereby cost is increased.

SUMMARY OF THE INVENTION

An object of the present invention is to improve a mounting property of a dust cover and an outer appearance of the dust cover.

According to the present invention, a mounting structure of a dust cover of a hydraulic shock absorber is provided in which when a dust cover is mounted to an outer periphery of a rod member which is slidably inserted to an interior of a cylinder member, a flange portion provided in one end of a tubular portion of the dust cover is clamped between a mounting bracket provided in the outer periphery of the rod member and support means. An annular gap is formed between an opening in the other end of the tubular portion and the cylinder member. A portion continuously provided in an end portion of a portion forming a tubular portion in a metal pipe material of the dust cover is reduced in diameter toward an inner diameter side. This forms an annular diameter-reduced portion including wall portions at both sides. A flange portion is obtained by crimping and folding the wall portions at both sides of the diameter-reduced portion in the dust cover in an axial direction by press working, formed so as to be continuously provided in an inner diameter side of one end of the tubular portion. The flange portion of the dust cover is clamped between the mounting bracket and the support member.

Further, according to the present invention, a manufacturing method of a dust cover in a hydraulic shock absorber mounted to an outer periphery of a rod member which is slidably inserted to an interior of a cylinder member. A metal pipe is prepared which is a material for a dust cover. The metal pipe material is rotated, pressing a roller on an outer periphery of a portion which is continuously provided in an end portion of a portion forming a tubular portion of the dust cover in the pipe material. The portion which is continuously provided in the end portion of the portion forming the tubular portion in the pipe material is reduced in diameter to an inner diameter side. An annular diameter-reduced portion is formed including wall portions at both sides. A flange portion is formed by crimping and folding the wall portions at both sides of the diameter-reduced portion in an axial direction by press working so as to be continuously provided in an inner diameter side of one end of the tubular portion.

BRIEF DESCRIPTION OF THE DRAWINGS

The present invention will be more fully understood from the detailed description given below and from the accompanying drawings which should not be taken to be a limitation on the invention, but are for explanation and understanding only.

The Drawings:

FIGS. 3A to 3C show a dust cover, in which FIG. 3A is a cross sectional view, FIG. 3B is a plan view and FIG. 3C is an enlarged view of a portion C in FIG. 3A;

FIGS. 4A to 4D are schematic views showing a manufacturing step of the dust cover; and FIGS. 5A and 5B show a conventional dust cover, in which FIG. 5A is a half cross sectional view and FIG. 5B is a plan view.

DESCRIPTION OF THE PREFERRED EMBODIMENTS

Figure 1:
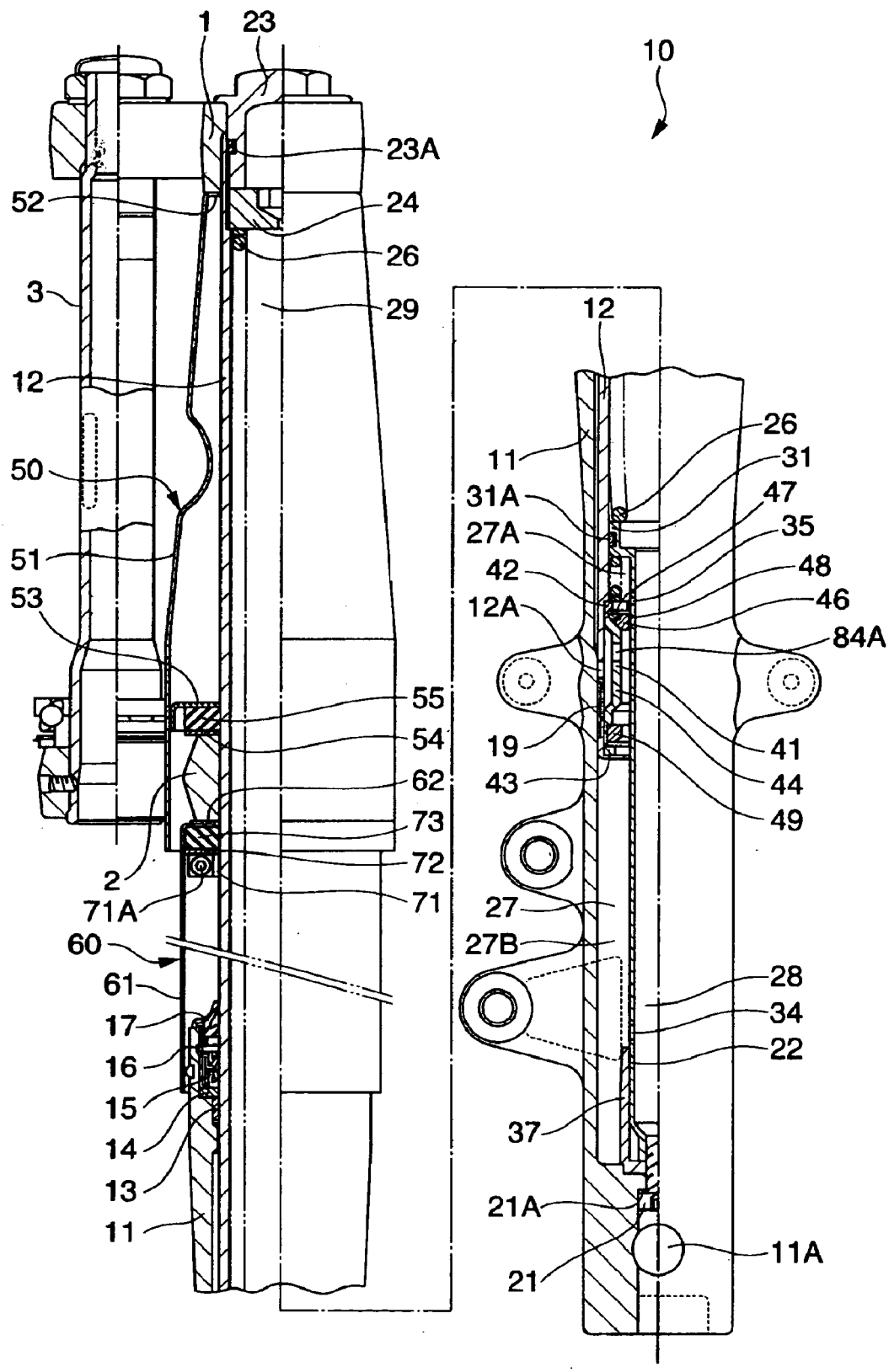
FIG. 1 is a cross sectional view showing a whole of a front fork.

A front fork 10 (a hydraulic shock absorber) is used in a motorcycle or the like. An inner tube 12 (a rod member) in a side of a vehicle body is slidably inserted into an interior of an outer tube 11 (a cylinder member) provided in a side of a tire wheel, being closed in one end and open in the other end, as shown in FIG. 1.

The front fork 10 can steer a front wheel (not shown) by holding the inner tube 12 by upper and lower mounting brackets 1 and 2, rotatably supporting the front wheel by a bearing portion 11A of the outer tube 11, and pivotally supporting a steering shaft 3 supported in center portions of the upper mounting bracket 1 and the lower mounting bracket 2 to a head pipe (not shown) of a vehicle body frame.

A guide bush 13, a seal spacer 14, an oil seal 15, a stopper ring 16 and a dust seal 17 are provided in an open end of the outer tube 11 to which the inner tube 12 is inserted. A guide bush 19 is provided in a lower end outer peripheral portion of the inner tube 12 which is inserted to the outer tube 11.

A bolt 21 is inserted to a bottom portion of the outer tube 11 via a copper packing 21A, and a hollow pipe 22 fastened by this bolt 21 is provided in a standing manner. A cap bolt 23 is screwed to an upper end portion of the inner tube 12 via an O-ring 23A.

An expanded piston portion 31 is provided in an upper end portion of the hollow pipe 22, and an oil chamber 27 is provided in an outer side of the hollow pipe 22. The piston portion 31 is provided with a piston ring 31A in an outer periphery thereof, and is in slidable contact with an inner periphery of the inner tube 12.

A suspension spring 26 is interposed between the piston portion 31 in an upper end portion of the hollow pipe 22, and a spring receiving member 24 supported by the cap bolt 23.

A piston 41 is provided in a lower end inner peripheral portion (a leading end portion) of the inner tube 12. The piston 41 is constituted by an annular upper piece 42 which is engaged with an inner diameter step portion of the inner tube 12, an annular lower piece 43 which is congealed by a lower end caulking portion of the inner tube 12, and a tubular collar 44 which is clamped by the upper piece 42 and the lower piece 43.

In the piston 41, a check valve 46 is arranged in an inner periphery of an upper taper portion in the tubular collar 44. The check valve 46 is energized by a spring 47 which is supported on a back surface by the upper piece 42. A taper surface of the check valve 46 is set on a taper surface of the upper taper portion, and an annular gap 48 is formed between an inner periphery thereof and an outer periphery of the hollow pipe 22.

In the piston 41, a check valve 49 is arranged in an lower inner peripheral portion of the tubular collar 44.

The piston 41 partitions the oil chamber 27 provided in the outer side of the hollow pipe 22 into upper and lower parts. That is, an upper oil chamber 27A is formed by the inner tube 12, the hollow pipe 22, the piston portion 31 and the piston 41. A lower oil chamber 27B is formed by the outer tube 11 in a lower portion of the piston 41 and the hollow pipe 22. Further, an oil reservoir chamber 28 is provided in an inner side of the hollow pipe 22. The hollow pipe 22 is provided with a plurality of through holes 34 which communicate the oil chamber 27 with the oil reservoir chamber 28 in a lower end side of the hollow pipe 22, and an orifice 35 which communicates the oil chamber 27 with the oil reservoir chamber 28 in an upper end side of the hollow pipe 22. A working fluid is charged in the oil reservoir chamber 28, and a gas chamber 29 is provided in an upper portion of the oil reservoir chamber 28 in the interior of the inner tube 12.

In this case, a rebound spring 36 for a maximum elongation is provided between the upper piece 42 of the piston 41 provided in the inner tube 12, and the piston portion 31 provided in the hollow pipe 22, thereby regulating a maximum elongation stroke.

Further, an oil lock piece 37 is clamped between a lower end portion of the hollow pipe 22 fastened by the bolt 21 and a bottom portion of the outer tube 11. A check valve 49 of the piston 41 is fitted to an outer periphery of the oil lock piece 37 at a maximum compression time, and a maximum compression stroke is regulated by pressurizing a working fluid in an oil lock oil chamber sectioned between the outer tube 11 and the oil lock piece 37.

Further, a hole 44A is provided in a tubular piece 44 of the piston 41, and a hole 12A is provided in a portion of the inner tube 12 in which the piston 41 is arranged. The working fluid in the oil chamber 27 is supplied to the guide bush 13 of the outer tube 11, the guide bush 19 of the inner tube 12, and a space between the tubes which is clamped by the guide bushes 13 and 19, thereby lubricating the guide bushes 13 and 19 and compensating a volumetric capacity in the space between the tubes.

Accordingly, in the front fork 10, an impact applied to the vehicle is absorbed and damped by the suspension spring 26 and an air spring in the gas chamber 29. A vibration of the suspension spring 26 generated together with the impact absorption is controlled based on the following damping operation.

(Compression Stroke)

In a compression stroke of the front fork 10, the inner tube 12 descends so as to increase the pressure in the lower oil chamber 27B, and the check valve 46 of the piston 41 moves upward so as to be opened, whereby the oil in the lower oil chamber 27B is substituted by the side of the upper oil chamber 27A. The oil amount obtained by multiplying cross sectional area of the inner tube 12 by stroke amount is moved to the oil reservoir chamber 28 from the lower oil chamber 27B via the through hole 34. At this time, a damping force caused by a passage resistance generated in the through hole 34 is generated.

(Elongation Stroke)

In an elongation stroke of the front fork 10, the inner tube 12 ascends so as to increase the pressure in the upper oil chamber 27A, generating a damping force caused by a passage resistance in the annular gap 48 when the oil in the upper oil chamber 27A moves to the lower oil chamber 27B from the annular gap 48 of the check valve 46 disposed on the upper taper portion of the piston 41, and a passage resistance is generated in the orifice 35 when the oil in the upper oil chamber 27A escapes from the orifice 35 of the hollow pipe 22 and moves to the lower oil chamber 27B via the oil reservoir chamber 28 and the through hole 34 of the hollow pipe 22.

Further, in this elongation stroke, the oil at an amount obtained by multiplying cross sectional area of the inner tube 12 by stroke amount is resupplied to the lower oil chamber 27B from the oil reservoir chamber 28.

Figure 2:
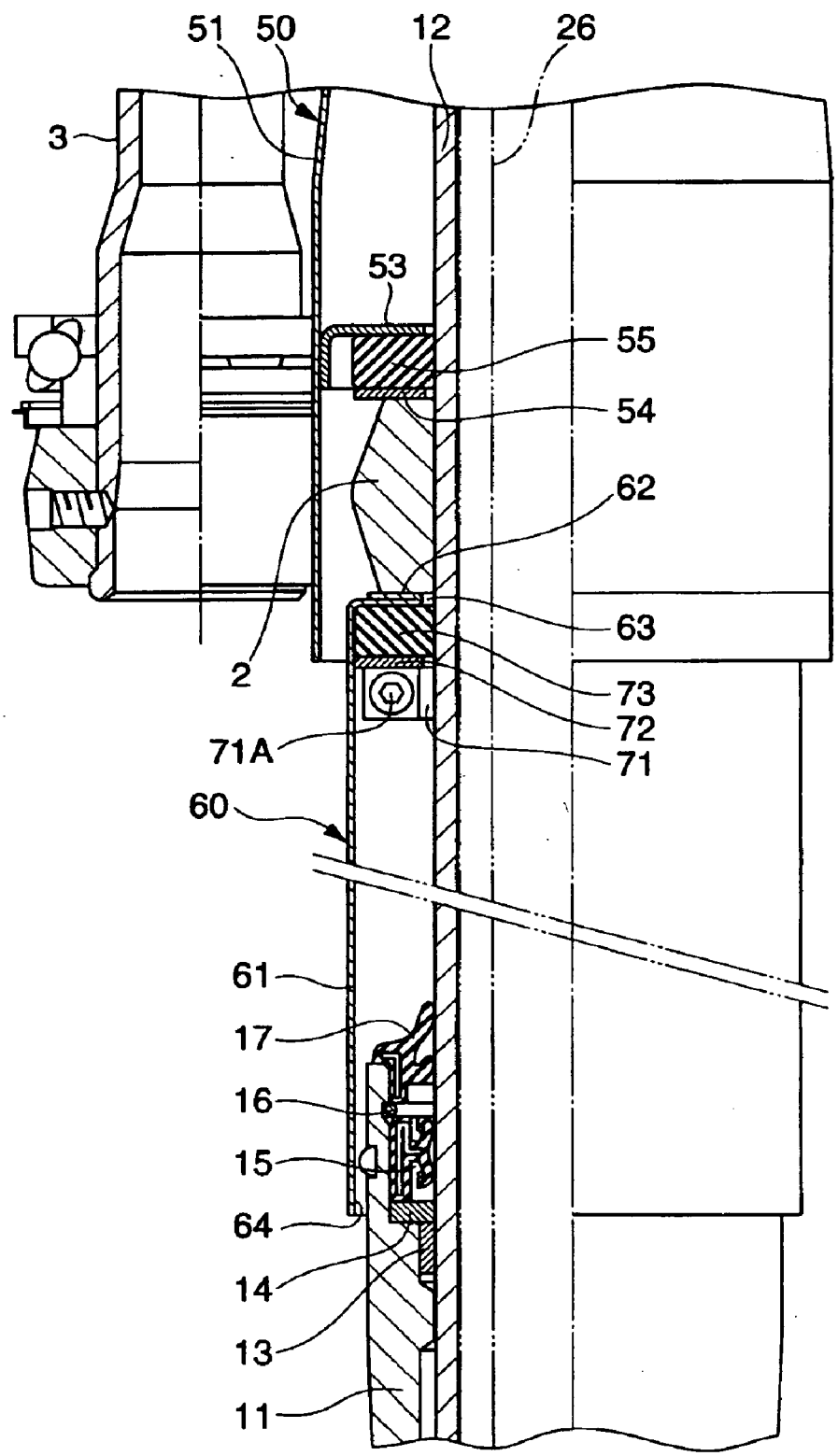
FIG. 2 is an enlarged view of a main portion in FIG. 1.
Figure 3A:
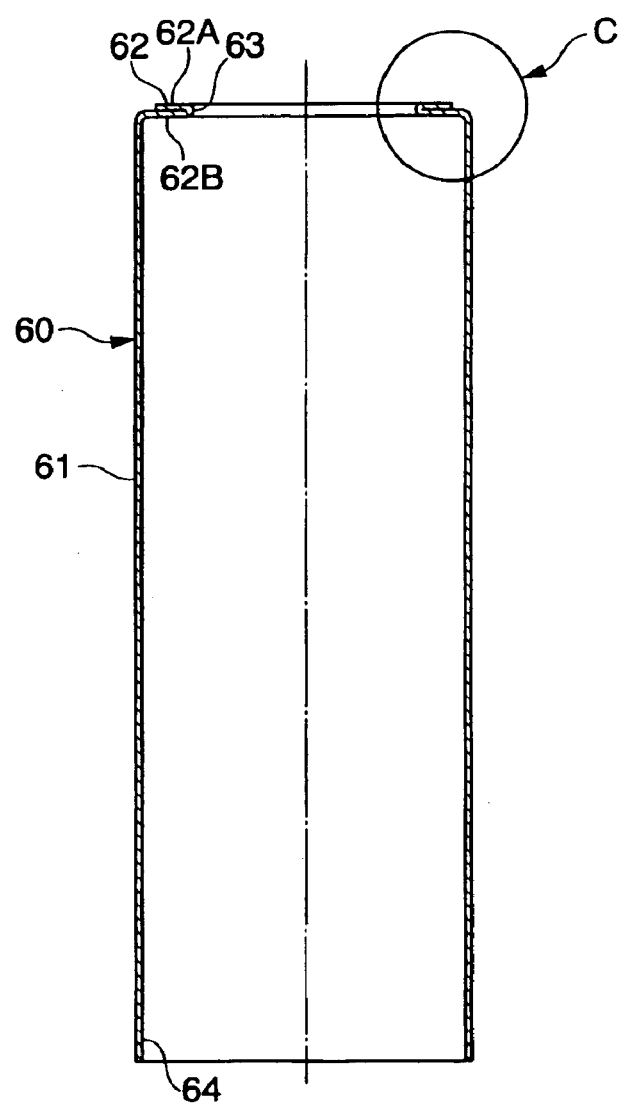
Figure 3B:
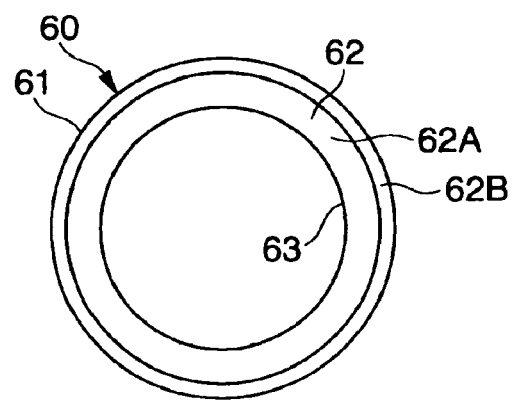
Figure 3C:
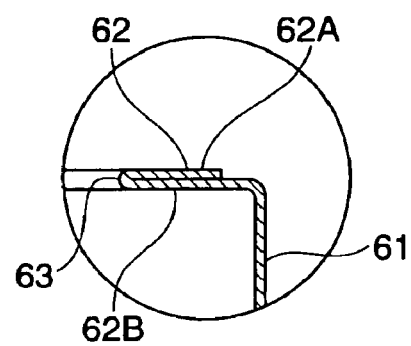
Figure 5A:
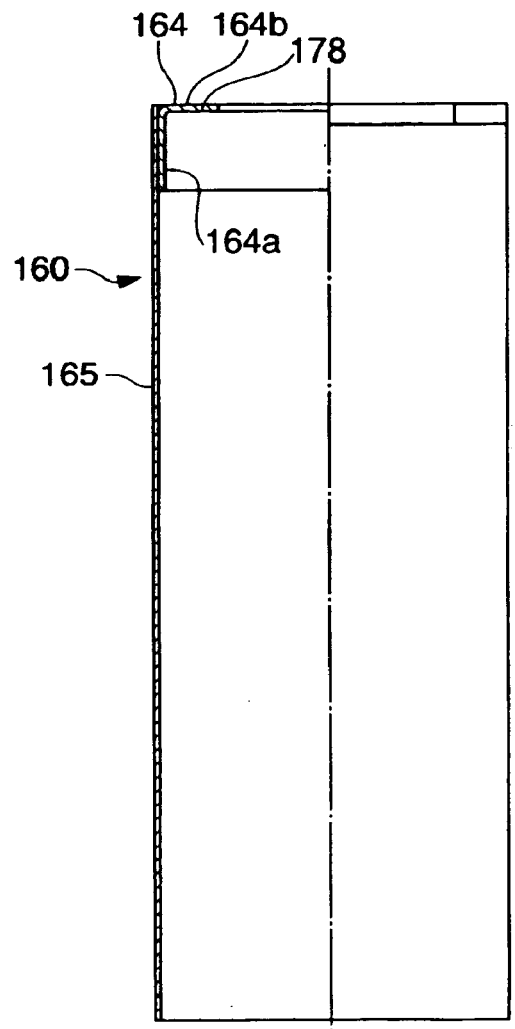
Figure 5B:
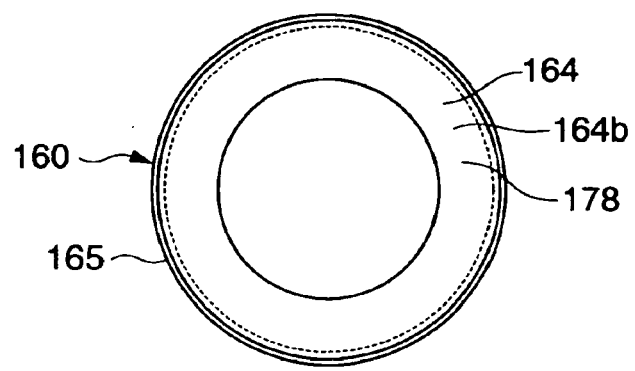

Accordingly, in the front fork 10, an upper cover 50 and a dust cover 60 are mounted to the outer periphery of the inner tube 12, as shown in FIG. 2.

The upper cover 50 is clamped and fixed between the upper mounting bracket 1 and the lower mounting bracket 2 by bringing a flange portion 52 provided in an upper end of a cylindrical tubular portion 51 into contact with the lower surface of the upper mounting bracket 1 provided in the outer periphery of the inner tube 12. This brings a mounting portion 53 provided in a middle portion in a lower end side of the tubular portion 51 into contact with an upper surface of a sheet 55 made of an elastic body such as a rubber, a synthetic resin or the like disposed on the upper surface of the mounting bracket 2 provided in the outer periphery of the inner tube 12 via a washer 54. The lower end portion of the upper cover 50 is extended up to a position surrounding the outer periphery in an upper end side of the dust cover 60 mounted to the inner tube 12 via the annular gap.

The dust cover 60 loosely fits center hole 63 of a flange portion 62 provided in an upper end of the cylindrical tubular portion 61 to the outer periphery of the inner tube 12. Further, the dust cover 60 is fixed by clamping the flange portion 62 between the lower surface of the lower mounting bracket 2 provided in the outer periphery of the inner tube 12, and an upper surface of a sheet 73 (support means) made of an elastic body such as a rubber, a synthetic resin or the like disposed on a stopper 71 fixed to the outer periphery of the inner tube 12 via a washer 72. The stopper 71 is a slotted head annular body, and is fixed to the outer periphery of the inner tube 12 by compressing the slotted head by means of a bolt 71A. The sheet 73 is compressed between the bracket 2 and the flange portion 62 in the dust cover 60, the stopper 71 and the washer 72, so as to be elastically expanded. The sheet 73 is in elastic contact with the inner periphery of the tubular portion 61 in the dust cover 60, and holds the dust cover 60 so as to be coaxial with the center axis of the inner tube 12. A lower end opening 64 of the dust cover 60 is extended up to a position surrounding the outer periphery in the upper end side of the outer tube 11 via the annular gap even when the front fork 10 elongates to the maximum extent.

In this case, the support means for clamping the dust cover 60 with respect to the lower surface of the lower mounting bracket 2 is not limited to the structure constituted by the stopper 71, the washer 72 and the sheet 73, but may be constituted by a suspension spring, a washer or the like which is provided in the outer periphery of the inner tube 12.

A description will be given below of the structure of the dust cover 60 according to an order of manufacturing steps (FIGS. 3A to 3C and FIGS. 4A to 4D).

(1) A metal pipe material 60A for the dust cover 60 is prepared (FIG. 4A). The pipe material 60A may employ a steel pipe, a stainless steel pipe and the like.

(2) The pipe material 60A is rotated, and a rotating roller 65 is pressed against an outer periphery of a portion which is continuously provided in an end portion of a portion forming the tubular portion 61 of the dust cover 60 in the pipe material 60A. The portion continuously provided in the end portion of the portion forming the tubular portion 61 in the pipe material 60A is compressed to a side of an inner diameter, and an annular diameter-reduced portion 62C including wall portions 62A and 62B at both sides is formed (FIG. 4B). The diameter-reduced portion 62C is structured such that an interval between both walls 62A and 62B is narrowed toward a crossing portion therebetween, and both the walls 62A and 62B compresses the crossing portion so as to form a U shape or a V shape. In the diameter-reduced portion 62C, it is preferable to make an outer peripheral diameter of the wall 62A in a side of a free end smaller than an outer peripheral diameter of the wall 62B connected to the tubular portion 61 (FIGS. 3A to 3C), and prevent the outer periphery of the wall 62A from protruding to an outer side of the tubular portion 61.

(3) The walls 62A and 62B at both sides of the diameter-reduced portion 62C are formed by continuously arranging the flange portion 62 crimped and folded in an axial direction by press working using upper and lower metal molds 66A and 66B in the inner diameter side of one end of the tubular portion 61 (FIGS. 4C and 4D). The metal mold 66B is inserted into the tubular portion 61, and the wall 62A is covered and pressurized by the metal mold 66A.

According to the present embodiment, the following operations and effects can be obtained.

(1) The flange portion 62 of the dust cover 60 is formed by crimping and folding the wall portions 62A and 62B of the diameter-reduced portion 62C formed in the pipe material 60A in the axial direction according to the press working between the upper and lower molds 66A and 66B. That is, since the flange portion 62 is formed according to the independent press working which is sequentially carried out with the formation of the diameter-reduced portion 62C, the flatness of the flange portion 62 is easily secured without being affected by the formability of roundness (radius of circle) in the outer peripheral side R of the flange portion 62, such as in the case of forming the flange portion 62 according to a drawing process. Further, the roundness R (the radius of circle) is not generated in the periphery of the center hole 63 of the flange 62, and it is possible to maintain the flatness up to the periphery of the center hole 63 of the flange portion 62. Further, since two wall portions 62A and 62B are folded and crimped in the axial direction, a bend of one wall portion is absorbed, and flatness is easily maintained as a whole of the flange portion 62. Accordingly, when bringing the flange portion 62 of the dust cover 60 into contact with the lower surface of the mounting bracket 2, the dust cover 60 is prevented from falling down and inclining, the opening 64 of the tubular portion 61 in the dust cover 60 is not in contact with the outer periphery of the outer tube 11, and malfunction and abnormal noise are not generated in the front fork 10.

(2) Since the flange portion 62 of the dust cover 60 is formed by folding two wall portions 62A and 62B, it is possible to increase the total thickness of the flange portion 62 so as to secure a rigidity and strength thereof. Accordingly, even if thinning of the pipe material 60A in the dust cover 60 occurs, breakage of the flange portion 62 does not result.

(3) Since the dust cover 60 is constituted by one part, a welding process or the like is not required, and it is possible to reduce the manufacturing cost. Further, since the welding process is not applied, the angularity of the flange surface in the flange portion 62 is easily maintained with respect to the center axis of the tubular portion 61 in the dust cover 60, the flatness of the flange surface does not get out of order due to a welding distortion, and a welding trace is not generated. As a result, exterior appearance and commodity and saleability properties are improved.

(4) It is possible to form the diameter-reduced portion 62C by pressing the roller 65 to the outer periphery of the rotating pipe material 60A without applying the drawing process to the pipe material 60A, and by extension, it is possible to form the flange portion 62. Accordingly, it is possible to use a stainless steel material (SUS304) for the pipe material 60A, and it is possible to improve the exterior appearance.

As heretofore explained, embodiments of the present invention have been described in detail with reference to the drawings. However, the specific configurations of the present invention are not limited to the embodiments, but those having a modification of the design within the range of the present invention are also included in the present invention. For example, the present invention can be applied to a hydraulic shock absorber in a four-wheel vehicle.

According to the present invention, it is possible to improve the mounting properties and the exterior appearance of the dust cover.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as being limited to the specific embodiment set out above, but should be understood to include all possible embodiments which can be encompassed within a scope of equivalents thereof with respect to the features set out in the appended claims.

What is claimed is:

1. A mounting structure of a dust cover of a hydraulic shock absorber, comprising:

a dust cover mounted to an outer periphery of a rod member which is slidably inserted to an interior of a cylinder member, a flange portion provided on end of a tubular portion of the dust cover is clamped between a mounting bracket provided in the outer periphery of the rod member and a support member, an annular gap being formed between an opening in the other end of the tubular portion and the cylinder member wherein, the tubular portion of the dust cover is formed of a metal pipe material, and the flange portion is integral with the tubular portion, the flange portion having a reduced in diameter portion at the one end portion of the tubular portion said flange portion having a tubular connected folded portion and a free end folded portion.

2. A mounting structure of a dust cover of a hydraulic shock absorber according to claim 1, wherein an outer peripheral diameter of the free end folded portion is smaller than an outer peripheral diameter of the tubular connected folded portion.

3. A mounting structure of a dust cover of a hydraulic shock absorber according to claim 1, wherein the support means for the dust cover comprises of a stopper fixed to the outer periphery of the rod member, and a seat comprising an elastic body seated via a washer on the stopper.

4. A manufacturing method of a dust cover in a hydraulic shock absorber mounted to an outer periphery of a rod member which is slidably inserted to an interior of a cylinder member, comprising the steps of:

preparing a metal pipe which is a material for a dust cover;

rotating the metal pipe material, pressing a roller on an outer periphery of an end portion of a tubular portion of the pipe material, diameter-reducing the end portion of the tubular portion forming an annular diameter-reduced portion including wall portions at both sides of the diameter reduced portion; and forming a flange portion by crimping and folding the wall portions at both sides of the diameter-reduced portion in an axial direction according to a press working so as to be continuously provided in an inner diameter side of one end of the tubular portion.

5. A manufacturing method a dust cover of a hydraulic shock absorber according to claim 4, comprising the additional steps of:

inserting a first metal mold into the tubular portion, covering the tubular portion with a second metal mold, and pressing the wall in a free end side among the walls at the both sides.

* * * * *

UNITED STATES PATENT AND TRADEMARK OFFICE
CERTIFICATE OF CORRECTION

PATENT NO. : 6,910,559 B2
DATED : June 28, 2005
INVENTOR(S) : Kazuo Wada

It is certified that error appears in the above-identified patent and that said Letters Patent is hereby corrected as shown below:

<u>Title page,</u>
Item [73], Assignee, should read -- Showa Corporation --.

Signed and Sealed this

Thirtieth Day of August, 2005

JON W. DUDAS
*Director of the United States Patent and Trademark Office*